(12) United States Patent
Paresi

(10) Patent No.: US 10,845,499 B2
(45) Date of Patent: Nov. 24, 2020

(54) SYSTEMS AND METHODS FOR SCANNING PALLETIZED CARGO

(71) Applicant: IDSS Holdings, Inc., Armonk, NY (US)

(72) Inventor: Joseph S. Paresi, New York, NY (US)

(73) Assignee: IDSS Holdings, Inc., Armonk, NY (US)

( * ) Notice: Subject to any disclaimer, the term of this patent is extended or adjusted under 35 U.S.C. 154(b) by 225 days.

(21) Appl. No.: 15/875,641

(22) Filed: Jan. 19, 2018

(65) Prior Publication Data

US 2018/0224569 A1     Aug. 9, 2018

Related U.S. Application Data

(60) Provisional application No. 62/448,983, filed on Jan. 21, 2017.

(51) Int. Cl.
| | |
|---|---|
| *G01N 23/04* | (2018.01) |
| *G01V 5/00* | (2006.01) |
| *G01N 23/046* | (2018.01) |
| *G01N 23/10* | (2018.01) |

(52) U.S. Cl.
CPC ......... *G01V 5/0066* (2013.01); *G01N 23/046* (2013.01); *G01N 23/10* (2013.01); *G01V 5/005* (2013.01); *G01N 2223/643* (2013.01)

(58) Field of Classification Search
CPC .. G01V 5/0016; G01V 5/0008; G01V 5/0091; G01V 5/0066; G01V 5/0041
See application file for complete search history.

(56) References Cited

U.S. PATENT DOCUMENTS

| | | |
|---|---|---|
| 5,182,764 A | 1/1993 | Peschmann et al. |
| 2004/0247069 A1 | 12/2004 | Arai et al. |
| 2008/0232541 A1 | 9/2008 | Kang et al. |
| 2009/0060128 A1 | 3/2009 | Kang et al. |
| 2011/0142201 A1 | 6/2011 | Eberhard et al. |
| 2012/0328071 A1* | 12/2012 | Katsumata ............... A61B 6/14 378/4 |
| 2016/0231454 A1 | 8/2016 | Morton |
| 2018/0031495 A1 | 2/2018 | Diehm et al. |
| 2019/0041341 A1 | 2/2019 | Paresi |

OTHER PUBLICATIONS

International Search Report and Written Opinion dated Apr. 12, 2018 in connection with International Application No. PCT/US2018/014490.

(Continued)

*Primary Examiner* — Don K Wong
(74) *Attorney, Agent, or Firm* — Wolf, Greenfield & Sacks, P.C.

(57) ABSTRACT

Provided are CT scanning systems and architectures that utilize a unique approach to scanning large objects. Various embodiments of the architecture incorporate a horizontally mounted CT gantry. The horizontal gantry can be raised or stored in a raised position so that a pallet or other object can be moved into a scanning position under the gantry. The gantry is then lowered to enable a quickly executed a scan. Addition objects can be quickly positioned (once the gantry is raised) for subsequent scans allowing for greater throughput than conventional approaches.

22 Claims, 22 Drawing Sheets

(56) References Cited

OTHER PUBLICATIONS

International Search Report and Written Opinion dated Oct. 3, 2019 in connection with International Application No. PCT/US2019/41969.
International Preliminary Report on Patentability dated Aug. 1, 2019 in connection with International Application No. PCT/US2018/014490.

* cited by examiner

TABLE VI

| First Pallet followed by Back-to-Back Pallet Queue with Minimal Spacing | | | | Comments |
|---|---|---|---|---|
| Time to Put Pallet Into Starting Position | 15.00 | 15.00 | 15.00 | Next Pallet Waits in Input Tunnel Until CT Scan is Complete (Minimal Spacing Required) |
| Time to Put CT into Starting Position (Bo | 10.00 | 10.00 | 10.00 | |
| Time to Scan Pallet Based on Pallet Heig | 25.33 | 40.00 | 110.07 | |
| Total Time to Scan a Single Pallet | 50.34 | 65.00 | 135.07 | |
| Throughput with Queued Pallets | 72 | 55 | 27 | |
| Reported TSA Throughput Requirement | 50 | 50 | 20 | Sufficient Margin |

FIG. 22

SYSTEMS AND METHODS FOR SCANNING PALLETIZED CARGO

RELATED APPLICATIONS

This application claims priority under 35 U.S.C. § 119(e) to U.S. Provisional Application Ser. No. 62/448,983, entitled "A NOVEL APPROACH TO SCANNING PALLETIZED CARGO USING A HORIZONTALLY-MOUNTED COMPUTER TOMOGRAPHY SYSTEM, filed on Jan. 21, 2017, which is herein incorporated by reference in its entirety.

BACKGROUND

Cargo screening is a known major weakness in current aviation security systems. Traditional cargo screening solutions involve cutting open the shrink wrap around cargo pallets and performing a time-consuming trace screening, which is limited in the detection of explosives and the identification of anomalies within the palletized contents. Conventional X-ray solutions provide limited views for anomaly detection and are challenged in providing automated detection capabilities. Multi-view X-ray and pseudo/CT (Computer Tomography) approaches are also limited in anomaly and automated detection and tend to be cumbersome, costly, and have limited adoption. Electron beam solutions are also limited in the amount of power available for scanning and are prohibitively expensive.

While three-dimensional CT technology has been one of the most effective technologies for scanning, imaging and automating threat detection in aviation security, conventional use in scanning cargo is limited, inefficient, and costly.

SUMMARY

It is realized that there is a challenge in applying CT technology to air cargo scanning including, the recurring costs of the system, imposed, for example, because of the complexity of the various solutions, and their inability to efficiently load, position, and scan successive objects.

According to one aspect, provided is a CT scanning system and architecture that utilizes a unique approach to scanning, for example, large pallets. Various embodiments of the CT scanning system and architecture incorporate a horizontally mounted CT gantry. The horizontal gantry can be raised or stored in a raised position so that a pallet or other object can be moved into a scanning position. The gantry is then lowered to enable a quickly executed scan of the pallet or large object. For example, the gantry can be lowered to the bottom the pallet, and scanning can be executed from the bottom of the object to, for example, a the sixty five inch height. A sixty five inch height is described as an example herein, as sixty five inches is the largest dimension for a "C" class object under scanning guidelines provided by the Transportation Security Administration ("TSA"). Various embodiments can accept larger objects, including objects with height of or exceeding eighty four inches.

According to some aspects, by utilizing a horizontally mounted CT gantry, the CT scanning subsystem (including e.g., rotating x-ray emitters and detectors) and pallet movement subsystem are simplified. Further, the improved architecture can greatly reduce the complexity of the entire system design and reduce the mechanisms needed to process a high volume of scanned objects. Moreover, the horizontal mounting architecture provides significant improvements over conventional scanning systems and approaches. As a consequence of the simplicity in design and efficiency of the architecture, the costs and resources needed for manufacturing the scanning system/unit is significantly reduced.

Various embodiments of the scanning system provide an image quality and operational speed for effective detection of anomalies and further enable automated detection of items of concern within scanned objects (e.g., including C sized pallets, as well as smaller objects A or B sized pallets) that cannot be achieved in comparable conventional systems. An example feature that improves the design architecture is the ability to offer a solution that is robust enough for use over a 10-year operation life, and various examples can be provided fully within the department of homeland security ("DHS") price target (i.e., using minimal elements and highly robust architecture). Further the improved architecture is also configurable to accommodate scanning of A and B size pallets without additional complexity.

According to one embodiment, pallets or objects are deposited on a conveyor, moved automatically into a scanning area, wherein a scanning platform include x-ray emitters and detectors is transitioned along the entire height of the object as the emitters and detectors are rotated about the object. Obtaining data for the entire height of the object and completely around the object provides x-ray imaging data to construct images of anything contained in the pallet or object. In one example, once an object is scanned, the scanning platform returns to a position above the object. This allows the object to be automatically moved out of the scanning area and a new object to be moved into scanning position, achieving significantly greater throughput over conventional approaches.

According to one aspect, a scanning apparatus is provided. The apparatus comprises a scanning platform including a rotating member coupled to a first emitter assembly and at least first detector assembly; a lifting assembly for raising and lowering the scanning platform responsive to control signals; and at least one processor when executing configured to trigger the rotating member and the first emitter assembly; receive imaging data from at least the first detector assembly; generate control signals for moving the scan platform across a height of an object to be scanned in a z-axis; and capture x-ray attenuation data for the object in three dimensions.

According to one embodiment, the scanning platform is constructed and arranged on a horizontal plane relative to an installed surface. According to one embodiment, the scanning platform includes an open circumference around which the first emitter assembly and at least first detector assembly rotate. According to one embodiment, the scanning platform is constructed and arranged with the open circumference sized to accept large pallets having dimensions of at least 48 inch length, by 48-inch width, by 65 inch height. According to one embodiment, the system further comprises at least a first support arm.

According to one embodiment, at least a portion of the first support arm is disposed perpendicular to an installed surface for the scanning apparatus. According to one embodiment, the lifting assembly includes at least a first motor and a moveable engagement portion between the lifting assembly and the first support arm. According to one embodiment, responsive to control signals from the at least one processor the motor triggers raising or lowering of the moveable engagement portion along the first support member. According to one embodiment, the system further comprises a conveyor assembly to receive an object to be scanned.

According to one embodiment, the conveyor assembly is responsive to control signals from the at least one processor to move the object into a scan position under the scanning platform. According to one embodiment, the at least one processor activates the conveyor to move the object out of the scanning apparatus. According to one embodiment, the at least one processor activates the lifting assembly to position the scanning platform above a path of a second object to be scanned during movement into the scanning area. According to one embodiment, the system further comprises positioning sensors that identify when the object is under an open circumference defined by the scanning platform.

According to one embodiment, the at least one processor is configured to operate the conveyor to position the object under an open circumference defined by the scanning platform. According to one embodiment, the system further comprises an entry housing constructed to support a conveyor and receive a pallet from scanning. According to one embodiment, the system further comprises an exit housing constructed to support a conveyor and position a pallet for retrieval. According to one embodiment, the at least one processor is configured to reconstruct an image of the object to be scanned from the x-ray attenuation data.

According to one aspect, a scanning system for generating computer tomography ("CT") images is provided. The system comprises at least one processor operatively connected to a memory, the at least one processor when executing configured to: activate a rotating member and a first emitter assembly including an x-ray source connected to the rotating member; receive imaging data from at least a first detector assembly; generate control signals for moving a horizontally disposed scan platform including the rotating member along a height of an object to be scanned in a z-axis; capture x-ray attenuation data for the object in three dimensions. According to one embodiment, the at least one processor is configured to move the object to be scanned using a conveyor to position the object in a scanning area under the scanning platform.

According to one aspect, a method for capturing computer tomography ("CT") images of an object. The method comprises activating, by at least one processor, a rotating member, coupled to a first emitter assembly, including an x-ray source and at least first detector assembly; moving a scanning platform including the rotating member, the first emitter assembly, and the first detector assembly responsive to control signals from the at least one processor, wherein moving includes generating, by the at least one processor control signals for moving the scan platform across a height of an object to be scanned in a z-axis; and receiving, by the at least one processor, x-ray attenuation data from at least the first detector assembly. According to one embodiment, the method further comprises reconstructing a digital image of the object to be scanned from the x-ray attenuation data for the object.

According to one aspect, a non-transitory computer-readable medium comprising instruction, the instruction when executed cause a computer system to perform a method for capturing computer tomography ("CT") images of an object, is provided. The method comprises activating a rotating member, coupled to a first emitter assembly, including an x-ray source and at least first detector assembly; moving a scanning platform including the rotating member, the first emitter assembly, and the first detector assembly responsive to control signals, wherein moving includes generating the control signals for moving the scan platform across a height of an object to be scanned in a z-axis; and receiving x-ray attenuation data from at least the first detector assembly.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 22 includes Table VI, which describes example calculations to determine a scan throughput for each class of scanned objects, according to one embodiment.

DETAILED DESCRIPTION

Figure 1:
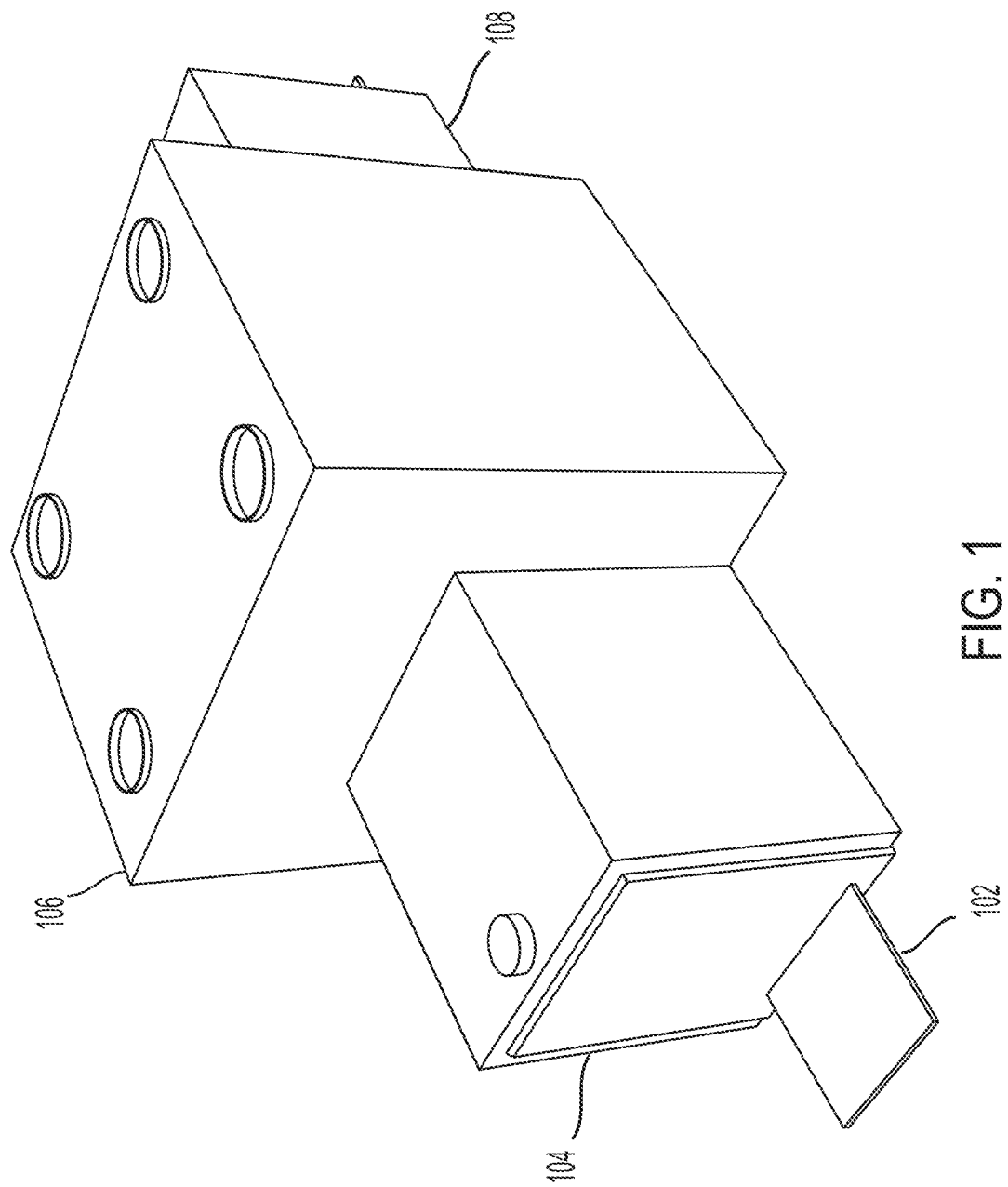
FIG. 1 is an external view of a scanning system, according to one embodiment.

According to various aspects, the scanning system includes a conveyor that accepts palletized objects from a forklift or other machinery. The conveyor moves the pallet through an entry aperture that can, in some examples, facilitate positioning of the pallet received from the forklift on the center of the conveyor. The entry aperture is sized to accommodate large pallets (e.g., C class pallets as defined by TSA). In other embodiments, the entry aperture can be sized to accommodate lager objects (e.g., larger width, height, and/or length). Once through the entry, the pallet is positioned by the conveyor under a scanning platform. For example, the pallet is positioned in the open space defined within a rotation member having a CT emitter and detector array. The object is scanned from all angles via the rotation of the rotation member, and scanned at all heights (e.g., along its Z axis) by raising or lowering the scanning platform. In one example, a scanning platform maintains an at rest position just above the height of an expected object (e.g., including the height of any base on which the object rests). The scanning platform can be lowered to the height of a pallet and a CT scan captured as the emitter and detector arrays are rotated around the object and raised along the object's height. A variety of detection algorithms can be used to analyze the returned scan information. For example, the detection algorithms can be used to identify potential explosives, weapons, anomalies in the object, among a number of other options.

Various efficiency improvements are realized in various embodiments of the current architecture. In one example, once scanning is complete, the scanning platform occupies an unobstructed position. With the scanning platform in an unobstructed position (e.g., above the height of a scanned object), the pallet or object can be moved automatically by the conveyor through an exit aperture, while subsequent objects are being transitioned into the scanning area through the entry aperture. Various models of some embodiments indicate scanning rates in excess of 20 pallets or skids per hour.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 illustrates an external view of an example embodiment of a scanning system 100. At 102 a palletized object or pallet (e.g., supported on a skid) for scanning can be placed on a conveyor 102. The conveyor feeds the pallet into an entrance tunnel 104. In some examples, the conveyor 102 can be motorized and operate automatically. For example, the conveyor can be triggered upon detection of a threshold weight on the conveyor (e.g., greater than weight of a skid). Various sensors are available for weigh detection, and a computer system (not shown) may control conveyor operation responsive to weight, motion detection, etc.). In some embodiments, additional positioning bars may be constructed within or around the entrance frame 104. For example, the positioning bars can be constructed to ensure a standard size pallet (e.g., class C pallet) is positioned in the center of the conveyor. The positioning bars can continue into the scanning frame 106 to ensure centering of an object. According to one embodiment, a scanning platform or CT gantry is housed within the scanning frame 106. The scanning platform or CT gantry is shown and described with greater detail below with respect to FIG. 2.

As the pallet is positioned within the center of conveyor the conveyor positions the pallet in the center of the scanning frame 106. Once centered, the scanning platform or CT gantry can be lowered into a scanning position at the base of the object. X-ray emitters and detectors are rotated about the object as the scanning platform is raised over the height of the object. The resulting data can be directly visualized as a three dimensional model of the contents of the scanned object. Further processing can include anomaly or threat detection based on the scan data.

According to some embodiments, scans of the object are executed from the base of the object to the top of the object, although scanning can occur in the opposite direction. Once scanning is complete the scanning platform is returned to a position above the object, permitting the object to be moved through an exit tunnel 108 on the conveyor. The positioning of the scan platform above the object to be scanned allows for efficient introduction of pallets and queuing of subsequent pallets/objects to be scanned. For example, the conveyor can have multiple independent sections that enable feeding of a first object and queuing of a second object, such that as the first object is scanned the next object travels only a short distance to a centered position under the scanning platform.

Figure 2:
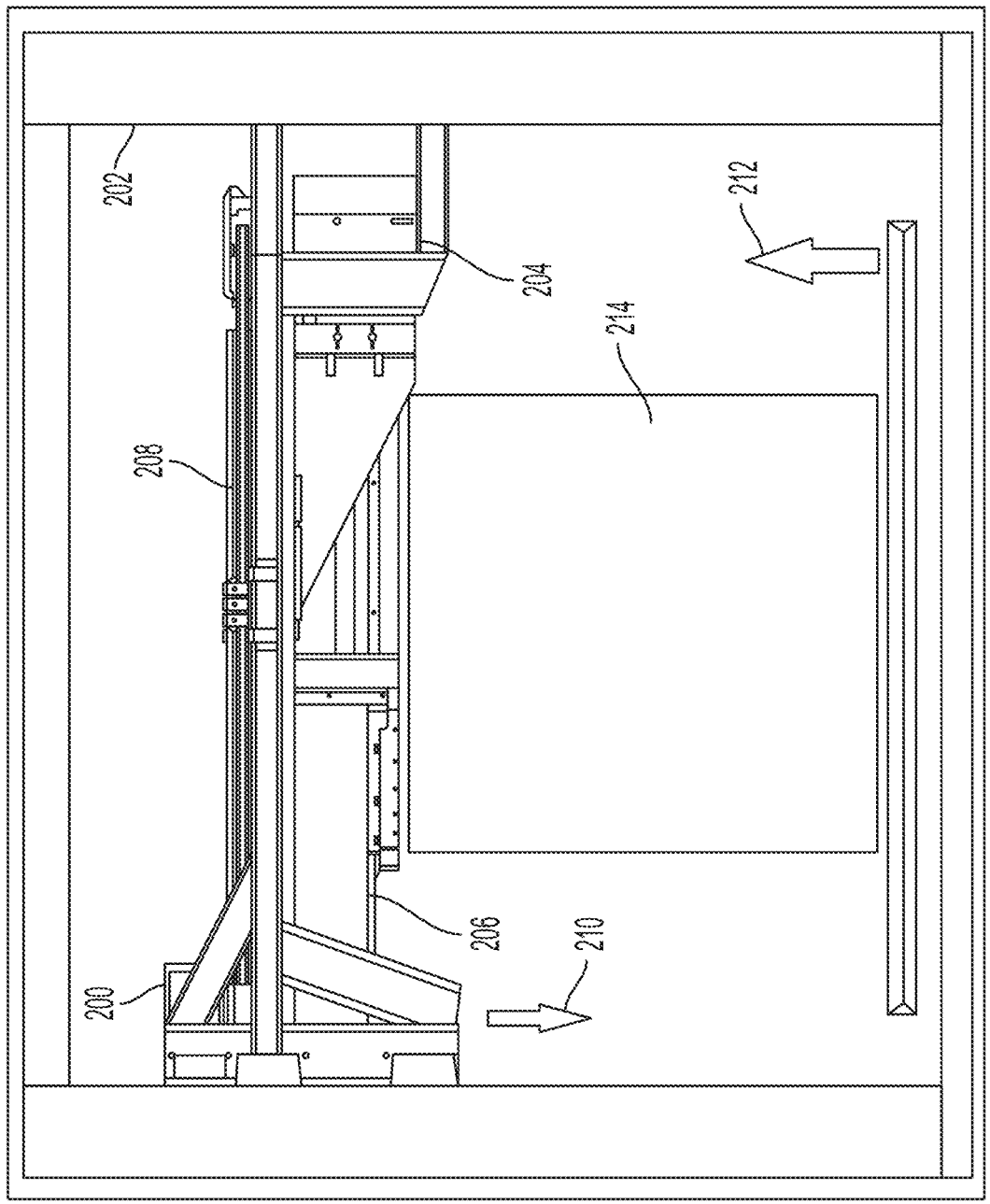
FIG. 2 is an internal view of a scanning system, according to one embodiment.

FIG. 2 shows an example internal view of an embodiment of the scanning system (e.g., 100 of FIG. 1), and in particular the CT gantry 200 housed within a scanning frame 202. According to various embodiments, the CT gantry 200 can include a scanning subsystem comprising an x-ray emitter 204 and a plurality of detectors 206, the emitter and some detectors positioned on opposite ends a rotating member 208. Addition detectors may also positioned adjacent or around the emitter to capture return signals.

According to some embodiments, the rotating member 208 is a circular member, and the emitter and at least some detectors are positioned on opposite sides of the circular rotating member 208. As is known, x-ray attenuation data obtained by passing x-rays through an object allow construction of a model of the scanned object. In some embodiments, the CT gantry 200 can be lowered (e.g., arrow 210) into a scan position at the base of the object 214. Scanning can commerce and include rotation of the emitter and detectors around the object 214. Then the CT gantry 200 is raised (e.g., arrow 212), which can occur a rate of 1.5 cm/s to provide a scan rate of approximately 27 C-sized objects per hour.

According to various embodiments, the CT gantry or scanning platform can be constructed and include some off the shelf components, for example, a 320 kilovolt 4500 watt high voltage power supply pair which provides 14 mA of current and matching x-ray. In other embodiments, increased voltage sources can be used to improve scanning penetration on an object and assist with scanning of higher density objects (e.g., 450 kilovolt 4500 watt supply). In some examples, the scanning platform is constructed to allow switching between the lower voltage x-ray source and the higher voltage x-ray source.

Additional embodiment, can use any x-ray source at any power level, within a horizontally oriented CT gantry, and the 320 and 450 kv sources are examples for illustration. Other embodiments, can also incorporate multiple energy sources or multiple energy detectors (some detectors are configured for dual energy detection and further detectors can be configured for more than two energies). In some examples, obtaining dual energy readings can be done either by using two difference sources or using filtered detectors or energy measuring detectors. In further embodiments, the system and/or CT gantry can be single or multi-energy discriminating, with correspond processing algorithms.

In some embodiments, the scanning platform includes a plurality of rows of x-ray detectors (e.g., 6 rows can be used to provide 1.94 millimeters of resolution at isocenter) e.g., at 206. In some examples, the power supply, x-ray, source, and detectors can include a 320 kV X-ray source with a 2 mm Focal Spot and 6 rows of cadmium tungstate (CdWO4) detectors—which together provide the 1.94-millimeter resolution at isocenter. In some examples, fewer detectors may be used (e.g., 4 rows of 1024 detectors can be used), also in other examples additional detectors can be used to improve scan resolution and/or scanning speed. In further embodiments, multiple scanning platforms each with their own emitter and detectors can be utilized to scan an object at multiple heights simultaneously. In some examples, the use of multiple scan platforms provides increased scan speed, although the increased scan speed can be accompanied by additional complexity in the architecture and control algorithms.

In further embodiments, known reconstruction algorithms can be used in conjunction with the horizontally oriented scan platform and resulting scan data. For example, known reconstruction algorithm from the DETECT™ Checkpoint Scanner can be integrated into the disclosed scanning systems.

Stated generally, reconstruction algorithms can be tailored in various embodiments to the geometry of the computer tomography design. Examples can start by using an existing reconstruction algorithm. Typically, reconstruction algorithms do not know or care that the CT gantry is horizontal. Thus, various embodiment tailor the reconstruction algorithm to address the number of detectors used (for example, including the number of rows and number of detectors per row), the size of the detectors, and the number of CT slices taken as the gantry rotates around the pallet. According to one example, the system can capture 4 images for every degree=4×360–1440 images, and tailor reconstruction accordingly. Typically the more images the better for reconstruction, but various embodiment balance improved imaging with taking too long to process.

Additionally, DETECT™ Checkpoint Scanner detection algorithms can also be integrated. Further examples execute a Stratovan-compliant Digital Imaging and Communication in Security ("DICOS") standard imaging protocol, and yet other examples can include DETECT™ Operator Controls and Display Checkpoint interface displays. In still other examples, a Common GUI can be provided for use with the system (e.g., compliant with TSA guidelines for GUI interfaces). Further embodiments are also configured with standard serial test interface program (STIP) interfaces, providing utilization consistent with existing and any future capabilities—which, for example, include associated cyber security applications that are compliant with TSA standards.

Figure 3:
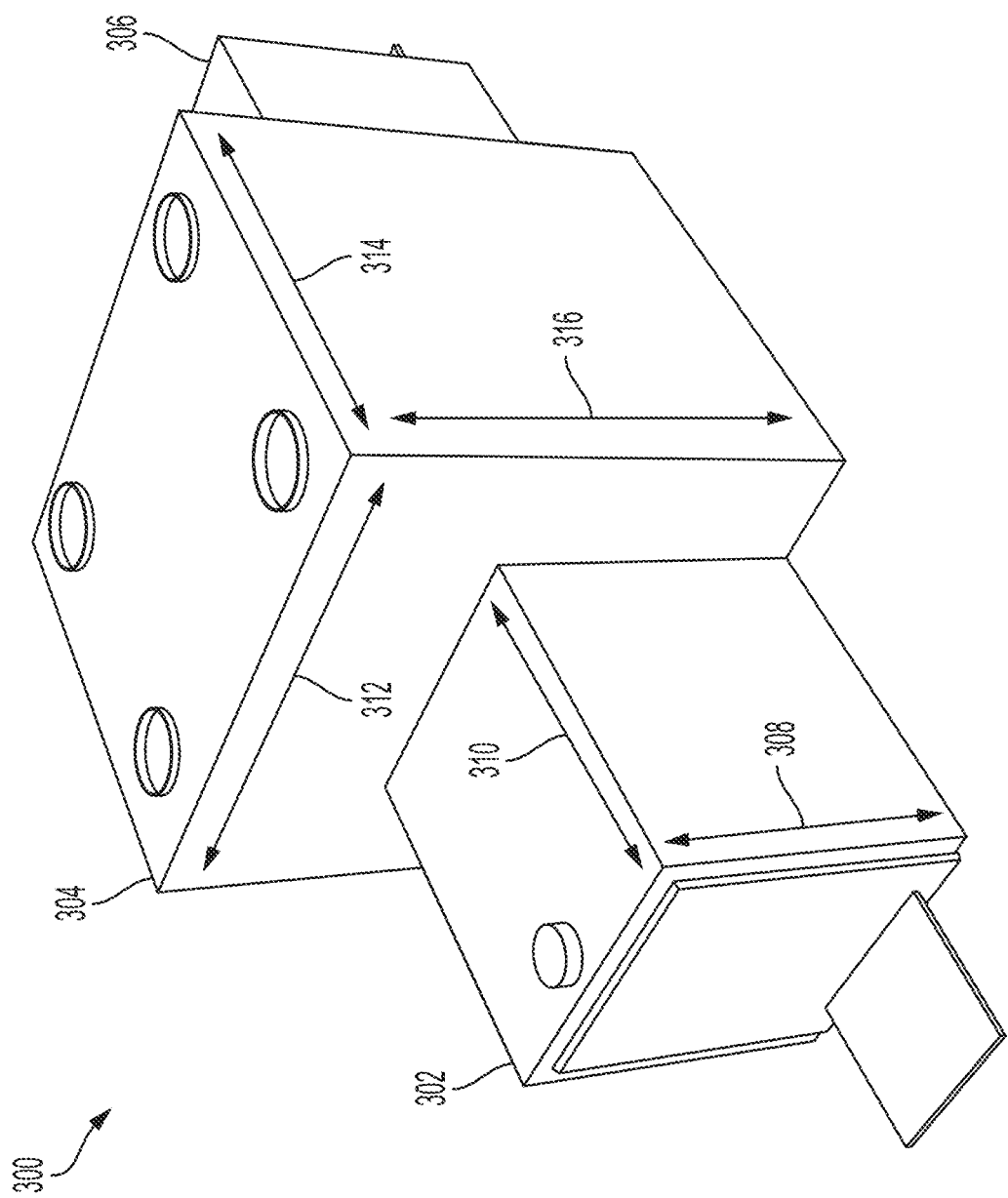
FIG. 3 illustrates example dimensions of a scanning system, according to one embodiment.

FIG. 3 shows an example embodiment of the scanning system 300 and associated dimensions. For example, the entry aperture 302 can be constructed to accommodate class C objects (as well as larger dimensioned objects). The scan frame 304 is constructed so class C objects can be moved underneath a scanning platform (not shown), and the exit aperture 306 also constructed so the scanned objects can be easily removed from the scanning system. Additional embodiments include sizing to accommodate taller objects, for example, up to eight four inches adding approximately 20 inches to each height dimension (e.g., 308 and 316) shown in FIG. 3.

According to one embodiment, the dimensions for the entry can include at 308 ninety five inches, by seventy eight inches at 310. The scan frame can measure one hundred thirty seven inches at 312, one hundred eighteen inches at 314, and one hundred twenty inches at 316, with the exit aperture 306 sized similarly to the entry aperture 302.

Known classifications of scan objects provided by TSA include: class A—Small defined as 49 cm Long×91 cm Wide×38 cm High, up to 50 kg (19.29" Long×35.83" Wide×14.96" High); class B—Medium defined as 80 cm Long×120 cm Wide×60 cm High, up to 100 kg (31.5" Long×47.25" Wide×23.62" High); and class C—Large defined as 122 cm long×122 cm Wide×153 High, up to 1000 kg (48.03" Long×48.03" Wide×60.25" High). Further, in order to comply with examples standards, various scanning systems must achieve scan rates for each class including: A—50 pallets/hr; B—50 pallets/hr; and C 20 pallets/hr. Various embodiments of the scanning system provide the identified scan rates for each class and/or exceed the identified scan rates.

According to further embodiments, the scanning system addresses the most challenging C size cargo pallets (of 48 inch by 48-inch-wide by 65 inch high), for example, based on the dimensions described in FIG. 3. Additional embodiments provide for scanning of objects of greater height. For example, various embodiments are dimensioned to receive and scan objects measuring up to thirty six inches by thirty six inches (length by width) and having a height of up to eight four inches.

By utilizing a horizontally-mounted computed tomography (CT) solution, the scanning system architecture minimizes the size of the Gantry/slipring needed to provide a rotating CT member, and further maximizes the photon energy penetrating the object to be scanned (e.g., a pallet). Various implementations also enable the ability to scan as objects in as little time as 110 seconds per pallet (assuming 65 inch height). To provide a benchmark with the 110 seconds to scan, adding in the time to move the pallet into place for scanning, embodiments of the current system can scan as many as 27 pallets per hour. Further embodiments can improve this rate using, for example, additional detector rows.

As discussed above, the system includes a horizontally mounted Computed Tomography scanning array that is moved up and down on at least a pair of supports. The movement up and down (e.g., along a z-axis) can be executed by commercially available motorized lifts responsive to control signals provided by the system. Further, the opening of the CT scanning platform or CT gantry (e.g., 200, FIG. 2) accommodates 48 inch×48 inch pallets—which can be lifted above the pallet's 65 inch height, allowing the pallet to be moved into position underneath the platform or gantry. Once an object is positioned, the CT gantry is lowered around the pallet to perform the full 3D CT scan in approximately 110 seconds.

Various embodiments are constructed with detectors that provide 1.94-millimeter resolution at isocenter (e.g., 6 rows of 1024 detectors), which provides extremely high resolution to detect anomalies and offers a high level of automatic target recognition based on the pallet density. Some additional embodiments can provide a lower resolution and/or provide decreased scan time using the same power, x-ray source, and detectors.

Modelling of known pallet characteristic provide data that indicates current embodiments can scan over 80% of all pallet types and automate the detection of items such as weapons, narcotics, and explosives, among other options. As discussed above, the architecture of various embodiment is quite resilient and provides for over 10-year expected operational life.

Figure 4:
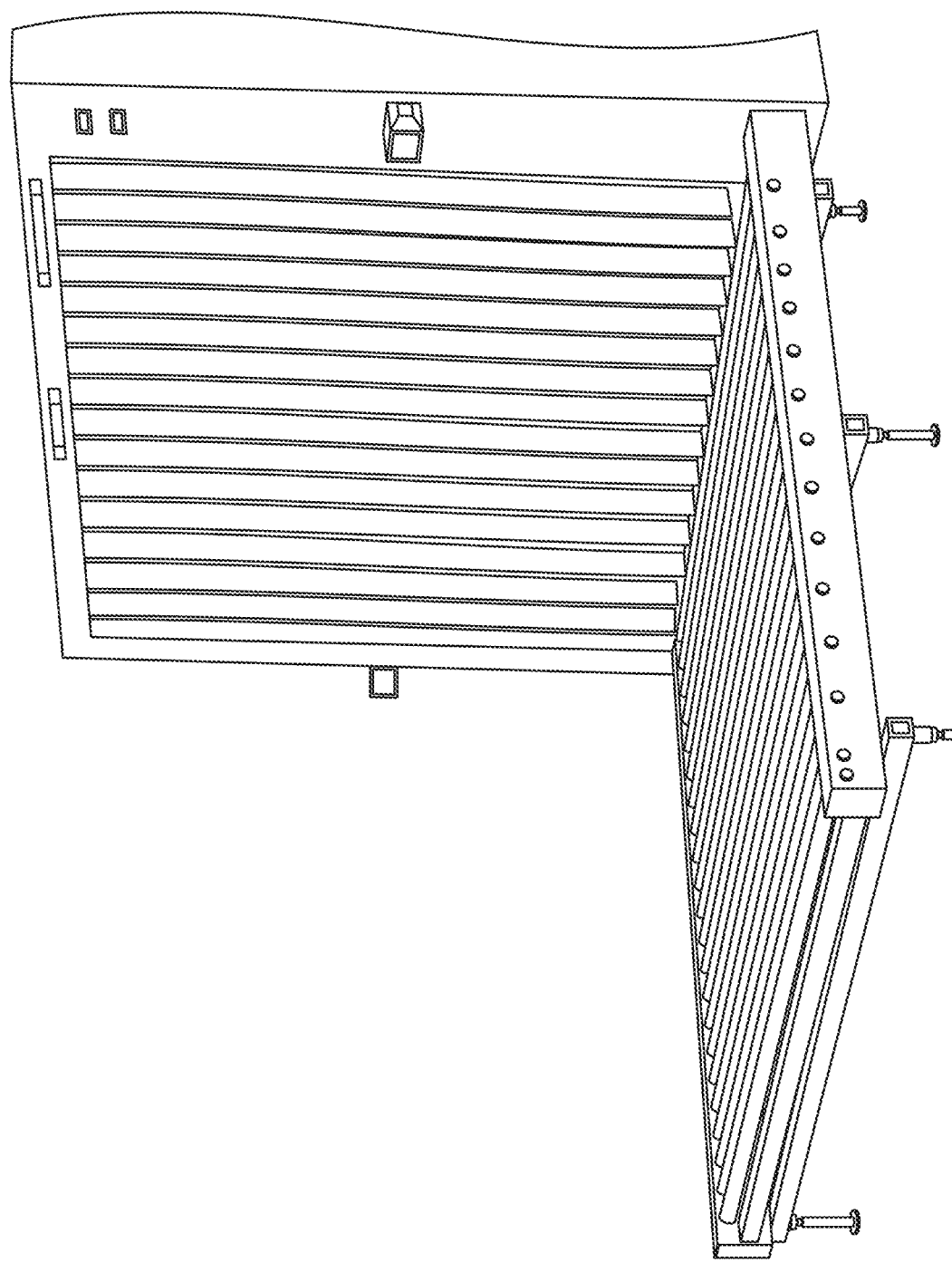
FIG. 4 is a view of an entry portion of a scanning system, according to one embodiment.

FIG. 4 is an example embodiment of entry portion 400 for a scanning system. As discussed above, some embodiments include guide ramps for position the objects to be scanned in the center of the entry. Additional embodiments can include actuators for moving scanned objects into a scanning space (e.g., into the open space defined by a scanning platform). In other embodiments, the scanning system can include visual detectors to confirm a scanned object is within the defined open space, and avoid collisions between scanning elements and the object.

Figure 5:
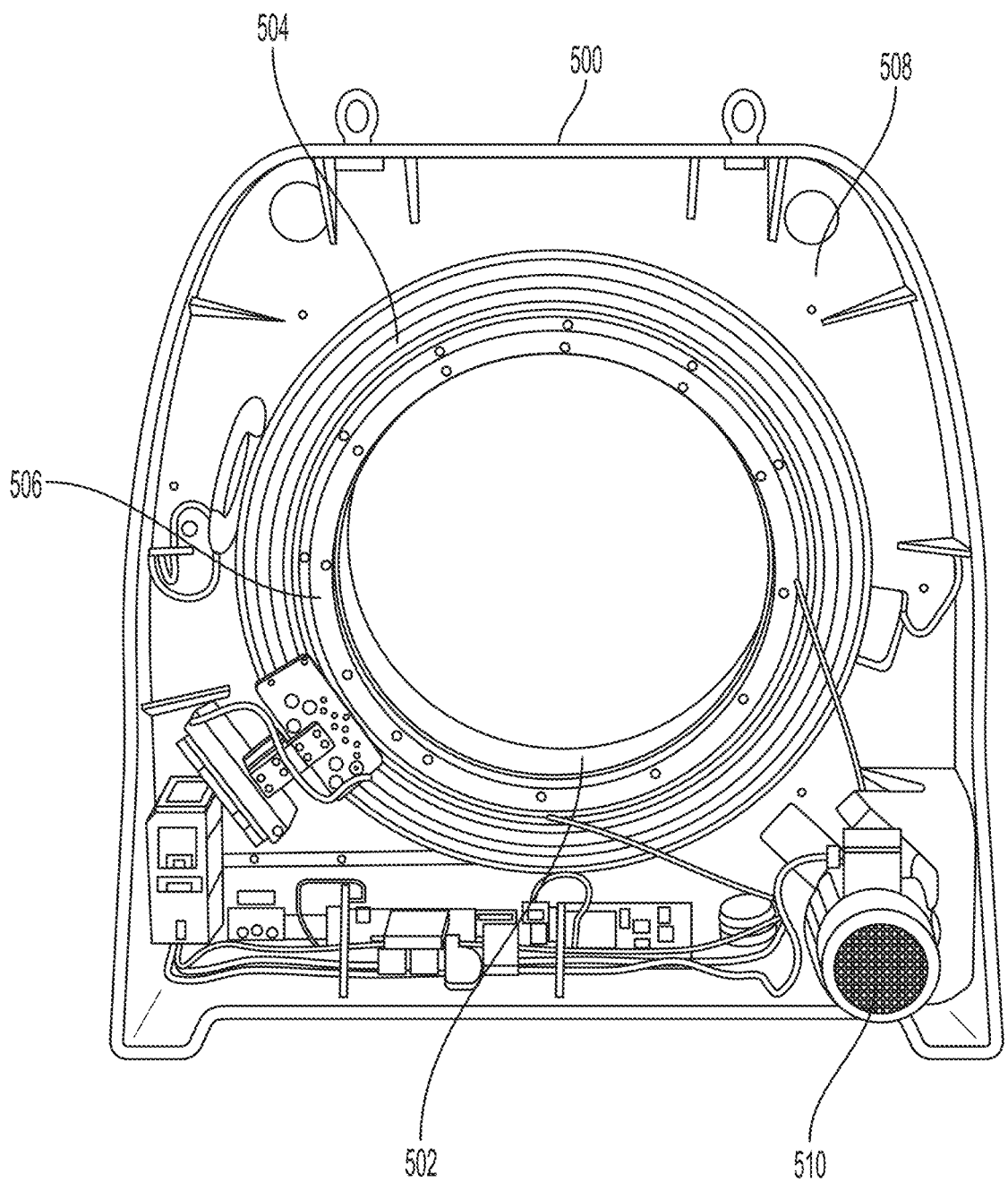
FIG. 5 is an example of components included in a scanning platform, according to one embodiment.

FIG. 5 shows example components of a rotate-rotate CT design and supporting gantry 500. According to one embodiment, a welded-tube steel gantry 500 with a traditional CT bearing 502 is used to support and rotate the scanning components of the system (e.g., emitter and detectors). The large bearings construction has been selected based on historic performance—and has performed extremely reliably in the field. According to one example, the rotation speed is 60 RPM effectuated by a rotation motor 510 to support the penetration and resolution targets. Further examples are constructed to provide streamlined architecture having a reasonable resulting detector pitch. Detector pitch is used and is defined as table distance traveled in one 360° gantry rotation divided by beam collimation. For example, if the distance traveled was 5 mm in one rotation and the beam collimation was 5 mm then pitch equals 5 mm/5 mm=1.0.

Further embodiments enable ample resolution in the Z axis (e.g., upward) for the cargo pallet scanner. According to other embodiments, power and control signals are transmitted to the rotating portion using a traditional CT slip ring 504. A non-contact capacitive data-link 506 is configured to transmit data. Various embodiments are constructed with a two (2) meter wide gantry frame 508 that provides the needed clearance for scanning large (e.g., class C) pallets. Not shown in FIG. 5, the x-ray source and detector spine assembly are mounted on the opposite side of the gantry.

According to another aspect, various software applications can be implemented to provide automated anomaly detection and/or threat detection. In further embodiments, imaging chain software is implemented to provide conversion of raw CT projections into 3D representations. For example, imaging chain software executes on the system that is configured to convert raw CT projections into an image. The converted image can also be presented and analyzed by various automated detection algorithms. In some settings the system can be configured to provide off-line image reconstruction (i.e., off load computational work to other computer system), as well as configuration to execute image construction/conversion in near real time.

According to one embodiment, the system uses the complete set of projection data for reconstruction and display of full three-dimensional image sets, that can be rotated and viewed from any angle is a user display. Three-dimensional image construction also enables for the interrogation of items that are behind other items in the display. Further embodiments, allow many objects to be cleared that would normally trigger shield alarms in conventional x-ray and multi-view x-ray systems. In addition, objects that are difficult to recognize from a particular view can always be rotated to the ideal angle for object recognition. Further embodiments, include various application programming interfaces implementing the TSA DICOS standard for image file transfers, which enables simplified remote screening and multi-operator viewing.

According to various embodiments, the generated image is available for direct display on the system. In one example, the image can be displayed directly on a screen attached to the scanning system. In parallel with the display, the image will be analyzed with software detection algorithms for automated threat detection. As threat/anomaly detection is executed, the display of the image can be highlight to show any potential issues, area that could not be scanned, matches to threat profiles, etc., which can include automated weapons detection.

According to various embodiments, the scan time for a C-pallet is approximately 110 seconds. This scan time thus is available for reconstruction and analysis of the image—even before presenting it to the operator in near real time.

Figure 6:
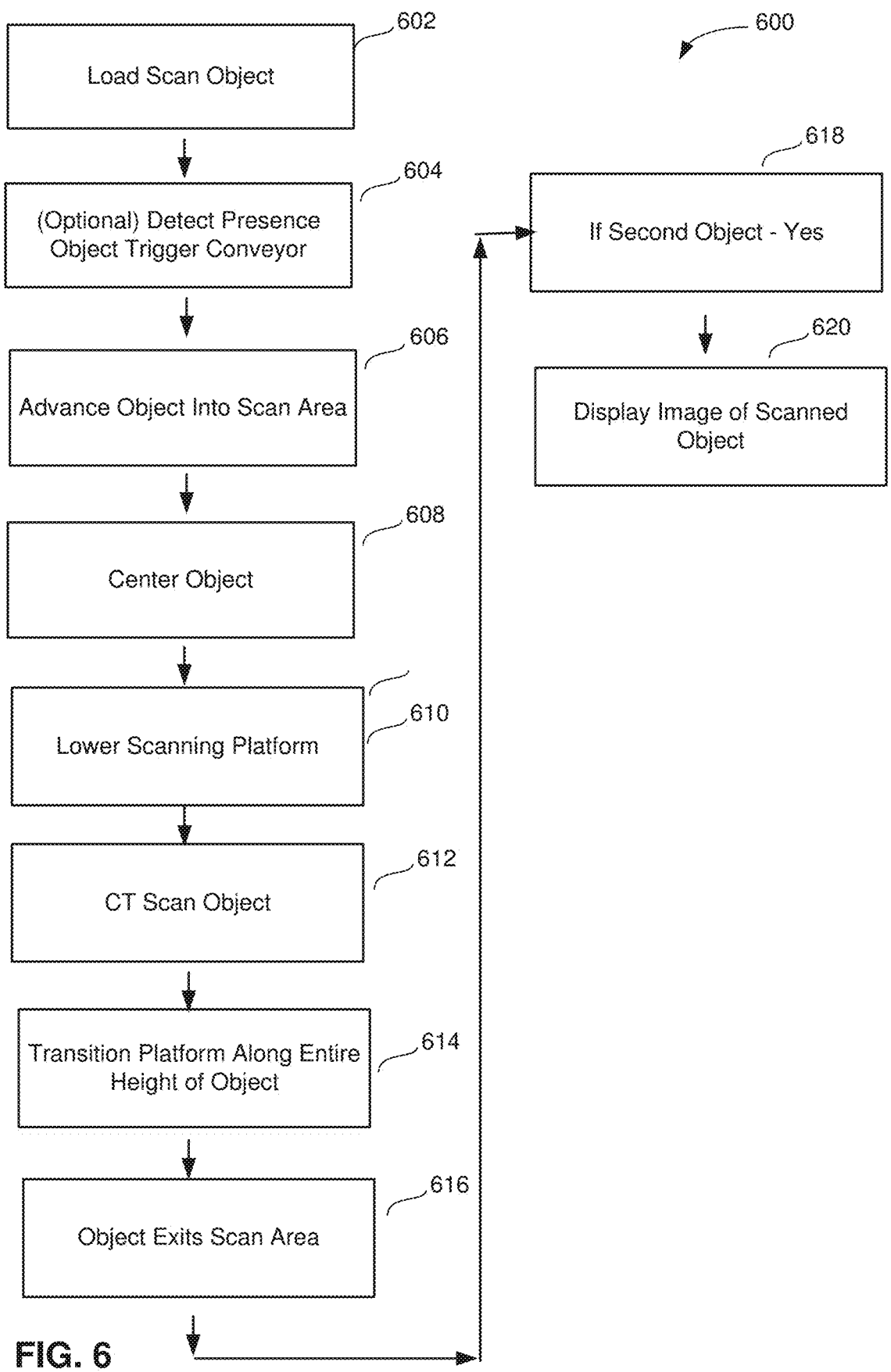
FIG. 6 is an example process flow for capturing CT data, according to one embodiment.

FIG. 6 illustrates an example process flow 600 capturing CT data. The process flow 600 can be executed by a scanning system (e.g., shown FIGS. 1-5). Process 600 begins at 602 with loading an object (e.g., a pallet) to be scanned onto a conveyor belt. Optionally, at 604 the system can detect the presence of the object (e.g., via weight, light or motion sensors, among other examples). At 606 the conveyor belt is activated to advance the object into a scanning area.

According to one embodiment, the conveyor feed and exit moves at a speed of 20 cm/sec. Such conveyors can be used with conventional x-ray cargo pallet scanners, and are capable of moving the object into position for the Horizontal CT in approximately twenty-five (25) seconds from initial loading. In various embodiments, follow-on object (e.g., pallets) can be staged and centered for scanning within another ten (10) seconds by queuing the objects on the conveyor. The actual time for the CT subsystem to be lowered into position and to scan an entire 65 inch high pallet is approximately 8.3 seconds and the scan time per C pallet is 110 seconds.

Accordingly, the system provides before any margin, a throughput of up to 27 pallets per hour using six (6) rows of detectors. As discussed above, another option includes reduce the number of rows to only four (4) to create additional resource benefits. However, to provide a target scan rate of at least 20 pallets per hour with a comfortable safety margin one design is constructed with six (6) detector rows.

At 608, the object is moved into a center position of the CT area and radiation doors are shut for safety. In some embodiments, positioning ramps are constructed on either side of the conveyor belt to facilitate centering of the object in the CT area. In other embodiments, actuators or push arms can be configured to center the object. Further, various sensors can facilitate or validate a centered position.

At 610, a CT Gantry is lowered to the bottom of the object (e.g., pallet) and the imaging of the pallet begins at 612. For example, at 612, the CT gantry is triggered to rotate at a speed of 60 Revolution per Minute (RPM) (e.g., which is sufficient to obtain the 360° scan at a pitch of 1.29). Tat 614, the CT gantry or scanning platform is moved upward. For example, the movement of the gantry is executed at a rate of 1.5 cm/second to complete the entire scan. In some embodiments, lifting motors are given control signals to lower the gantry or platform into place and then raise the gantry or platform to fully scan the object.

Once the object is completely scanned, the radiation doors can open at 616, and the object exits the CT area by operation of the conveyor belt. Optionally at 618, if a second object is present to scan, the queued object enters the CT area as the first object leave, re-executing steps 608 on. According to various embodiments, the generated image (from the CT scan) is displayed to an end user in near instantaneous time as the reconstruction occurs incrementally during the pallet scan (e.g., at 620).

Various embodiment contemplate different detectors for use in the scanning system. In some embodiments, increased penetration of high-energy x-rays requires detectors with significant stopping power. In one example, cadmium tungstate (CdWO4) is employed to provide a detector with high stopping power.

In some examples, the detectors are constructed with a size of 3.8 mm$^3$ to provide after magnification a 1.94 mm$^3$ resolution at isocenter. According to one embodiment, the design incorporates six (6) rows of 1024 Detectors to cover the required Field of View. Each detector block will consist of 128 detectors and be aligned into a detector assembly (referred to as the "Spine Assembly"). Each detector block includes associated Analog to Digital converters and the boards are mounted in the spine assembly to allow for easy maintenance. According to one embodiment, the system has built-in graceful degradation and can operate with up to 3% non-adjacent failed detectors.

Additional implementation can include hardware and software based scatter solutions. For example, the large capacity cargo scanner can include a calculated scatter subtraction in addition to any hardware anti-scatter system (scattered photons are expected to peak at an energy just below 300 keV). At this energy, anti-scatter plates can be used but combined with additional software based subtraction to enable a low scatter fraction for accurate determination of density. According to one embodiment, the design of the anti-scatter system includes analysis of the output of the live simulation study and test program. Various embodiments are provided to handle different peak energy levels to cover scenarios having varying peak energies.

Some example design specifications are provide in the following tables. Various embodiments can implement any one or more of the following design elements and should not be viewed as limiting any one embodiments to the listed specification.

TABLE I

| Pallet Size Data for Calculations | | | |
|---|---|---|---|
| Pallet Type | A | B | C |
| Pallet Length (mm) | 490 | 800 | 1220 |
| Pallet Width (mm) | 910 | 1200 | 1220 |
| Pallet Height (mm) | 380 | 600 | 1651 |

Table I provides size information in mm for multiple classes of scanned objects—Class A, Class B, and Class C.

TABLE II

| Example CT Section and Gantry Dimensions | | |
|---|---|---|
| CT Section and Gantry Size Calculations | | Comments |
| Minimum Diameter for 48" Pallets (mm) | 1725 | Diameter of 48" × 48" Pallet |
| CT Diameter Opening Margin | 225 | Open Space from Pallet to CT Gantry Start |
| CT Gantry Disk Opening from Pallet with Margin | 1950 | |
| Gantry Mounting Area for HVPS/X-ray and Detector Array | 550 | Based on Comet 320 Kv and 450 Kv HVPS Dimensions (498 mm wide) plus Margin (52 mm) X-ray Tube in Middle of Mounting Area |
| Gantry/Schliefring Size (Total Diameter, mm) | 2500 | Gantry and Slipring from Schleifring Connecticut |
| Space from Gantry Edge to Frame and Covers | 500 | Assumes Lift Motors Perpendicular to Tunnels (CT Subsection is Wider than Deep, so Not Part of this Spacing) |
| Total CT Section Distance from Input to Output | 3000 | |

Table II details example dimensions for one embodiment of a scanning system.

TABLE III

| Example Calculations For CT Scanner Design | | | | |
|---|---|---|---|---|
| Calculations for Cargo Pallets CT Design | | | | Comments |
| Circular FOV | 1803 | 1803 | 1803 | |
| Rectangle FOV (mm) | 1275 | 1275 | 1275 | need a little clearance from 48 inch pallet |
| Rectangle FOV (mm) | 1275 | 1275 | 1275 | 2*SQRT((B3/2)^2-(B4/2)^2) |
| Focal setback from circular FOV (mm) | 150 | 150 | 150 | distance from edge of aperture to focal spot |
| Detector setback from circ FOV (mm) | 50 | 50 | 50 | distance from edge of aperture to scintillator surface |
| Source to Isicenter Distance SID (mm) | 1052 | 1052 | 1052 | source to isocenter distance |
| Source to Detectors Distance SDD (mm) | 2003 | 2003 | 2003 | source to detector distance |
| Magnification | 1.90 | 1.90 | 1.90 | magnification of the isocenter image onto the detector |
| Fan Angle (Degrees) | 114 | 114 | 114 | |
| Spine arc length (mm) | 3983 | 3983 | 3983 | |
| Detector size at Isocenter (mm) | 2.00 | 2.00 | 2.00 | image of the detector at isocenter |
| Detector actual size (mm) | 3.81 | 3.81 | 3.81 | |
| Dead Space Between Detectors (mm) | 0.10 | 0.10 | 0.10 | Space between Detectors |
| Detector Pitch (mm) | 3.91 | 3.91 | 3.91 | |
| Number of columns of detectors (fan direction) | 1018.79 | 1018.79 | 1018.79 | Round to 1024 |
| Number of Rows (cone direction) | 6 | 6 | 6 | |
| Detector Size in Z at Isocenter (mm) | 1.94 | 1.94 | 1.94 | |
| Swath (mm) | 11.64 | 11.64 | 11.64 | |

Table III details example dimensions according to one embodiment of the scanning system.

TABLE IV

| Pitch Calculation | | Comments |
|---|---|---|
| # of 1024 Detector Rows | 6 | |
| Size of Detector at Isocenter in Z Direction (mm) | 1.94 | Approximately 2X Magnification for 1.94 mm at Isocenter |
| Resultant Multi-Detector Coverage Area (mm) | 11.64 | = # Rows × Det Size |
| Rotational Speed of CT Gantry (RPM) | 60 | Gantry Rotational Speed fairly Low with ~6 G of Force |
| RPM-mm | 698.4 | Coverage Area × Gantry Speed |
| Over 60 minutes (× RPM) | 60 | |
| Total Length Covered per swath | 11.6 | |
| CT Upmoving Scan Motor Speed (mm) (aka Belt Speed) | 15 | Estimated Speed on Linear Motor Rising CT Upward |
| Pitch Value | 1.29 | Extremely Low Pitch Offers Better Time on Target and Higher Photon Capture per Rotation |

Table IV provides example computations for a pitch value according to one embodiment.

TABLE V

| Horizontal CT Scan Time per Pallet | | | |
|---|---|---|---|
| Area Covered per Horizontal Rotation | 11.64 | 11.64 | 11.64 |
| Affect of Pitch on Swatch Area Covered | 15 | 15 | 15 |
| Time to Scan Pallet Height Based on Pallet Height and CT Swaths Width (sec) | 25.33 | 40.00 | 110.07 |

Table V describes example calculations for estimating a time to complete a full scan for each class of object (Class A—25.33, Class B—40.00, and Class C 110.07), according to one embodiment.

FIG. 22 includes Table VI. Table VI describes example calculations to determine a scan throughput for each class of scanned objects, according to one embodiment.

According to another aspect, when designing a CT system for the three dimensional analysis of cargo pallets, the inventors realized that the solution was not just a repackaging of a previous explosive detection system ("EDS") design. As such, the inventors evaluated potential options and concluded that a horizontally mounted approach would limit the size of the gantry and maximize the x-ray power that can be applied to the pallet being scanned. In further embodiment, the inventors selected a source (x-ray) that balanced the requirements for penetration and resolution while offering a suitable solution to a majority (>80%) of the technical requirements for scanning pallets. Additionally, various embodiments were constructed so that increased voltage/x-ray source generators could be readily swapping in if x-ray source requirements need to expand. Further embodiments incorporate a detector array designed with sufficient resolution for both anomaly and automated explosive detection. The array provides enough channels to image an entire pallet in 110 seconds and provide images at isocenter with a resolution of 1.94 mm.

Figure 7:
FIGS. 7-18 illustrate a hypothetical execution of the scanning functions described herein.
Figure 8:
Figure 9:
Figure 10:
Figure 11:
Figure 12:
Figure 13:
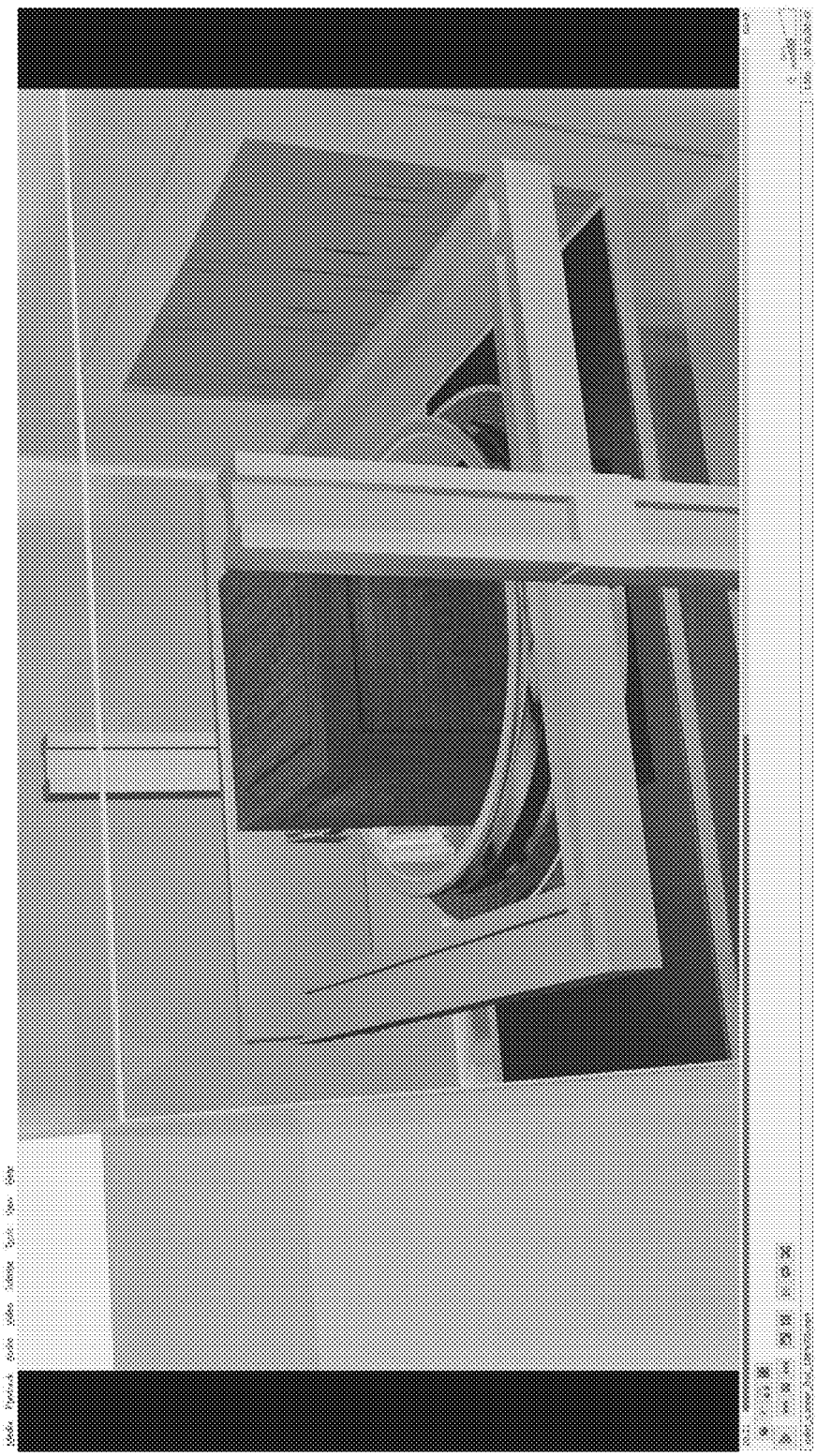
Figure 14:
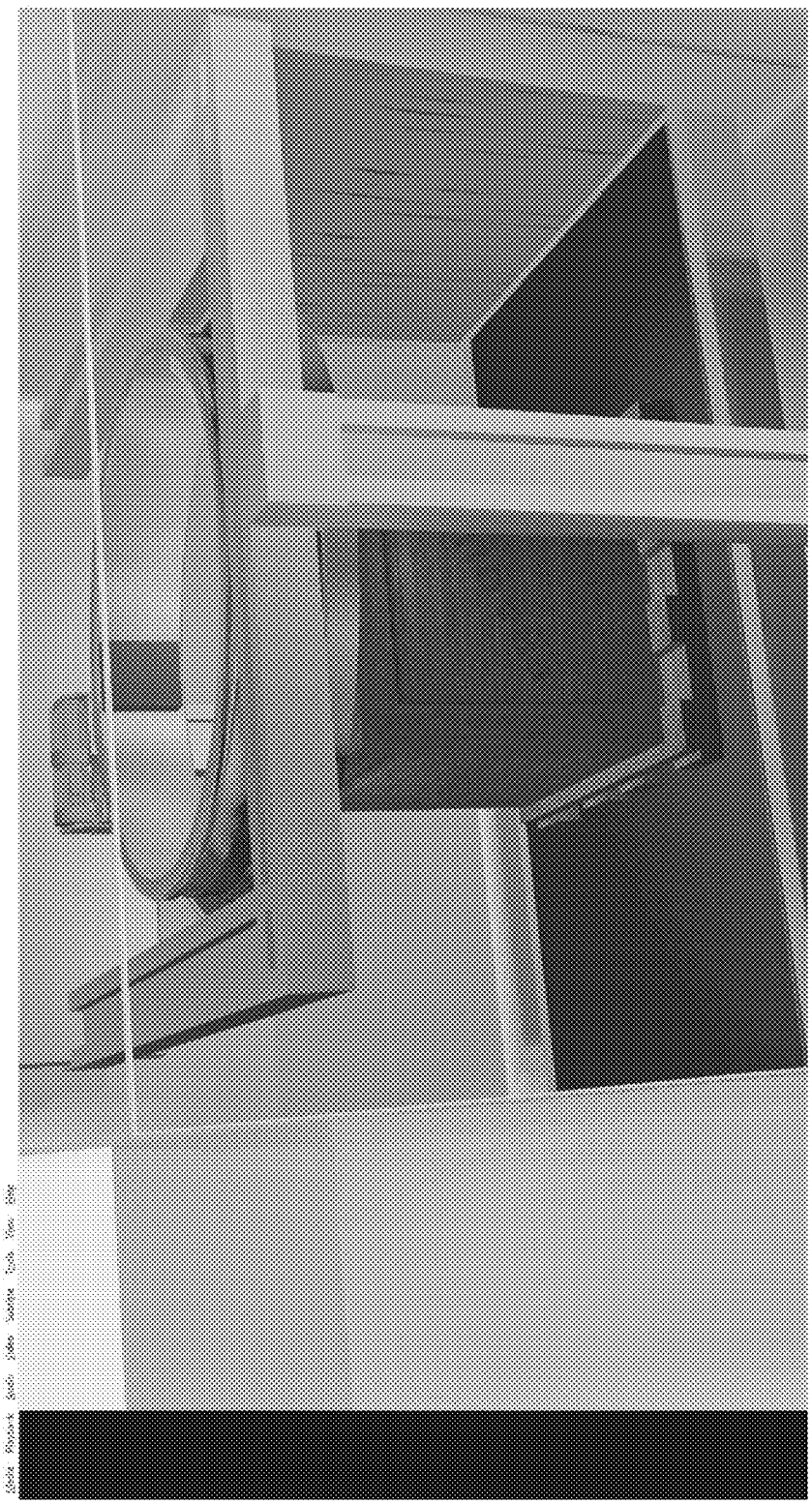
Figure 15:
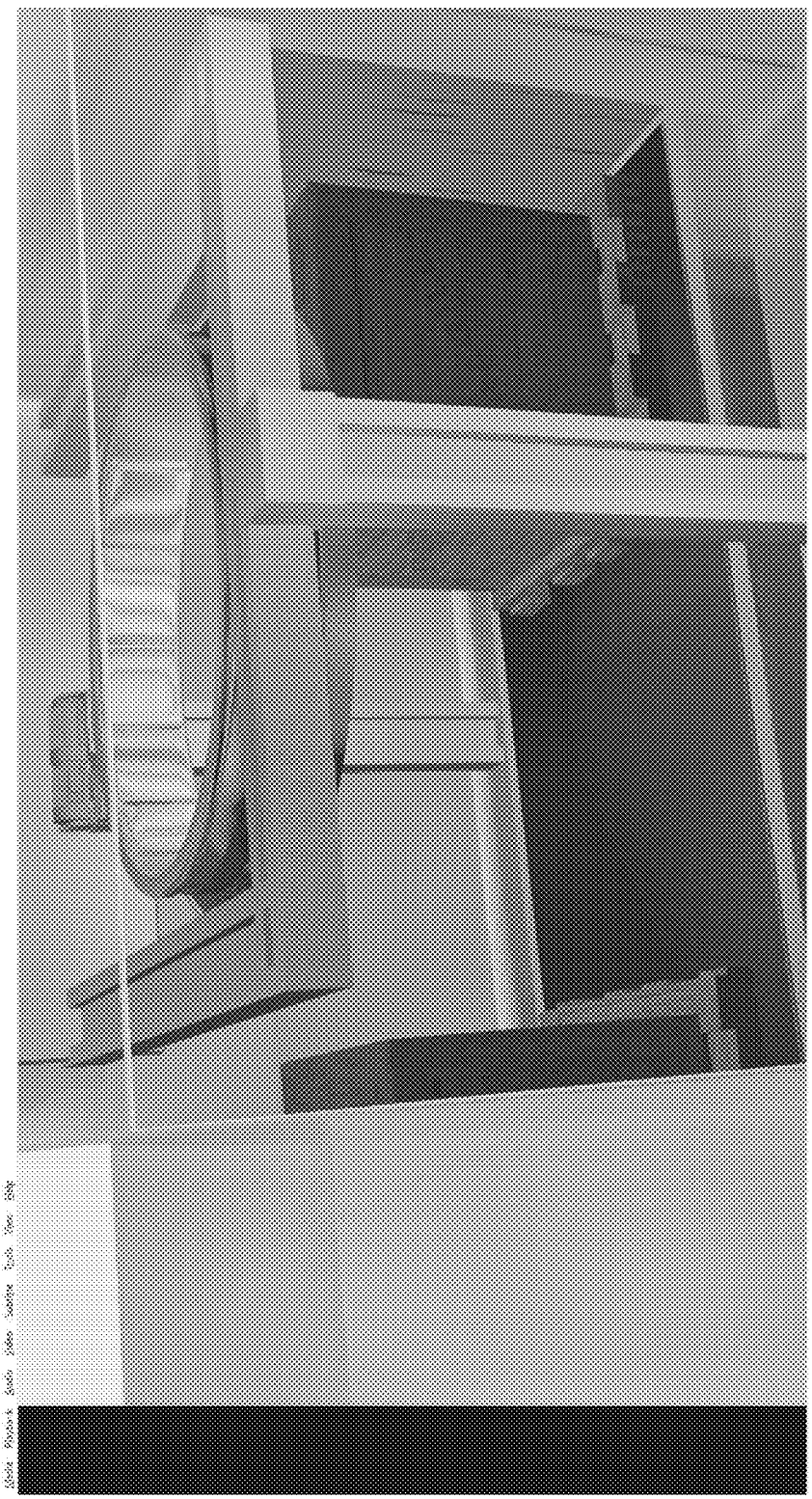
Figure 16:
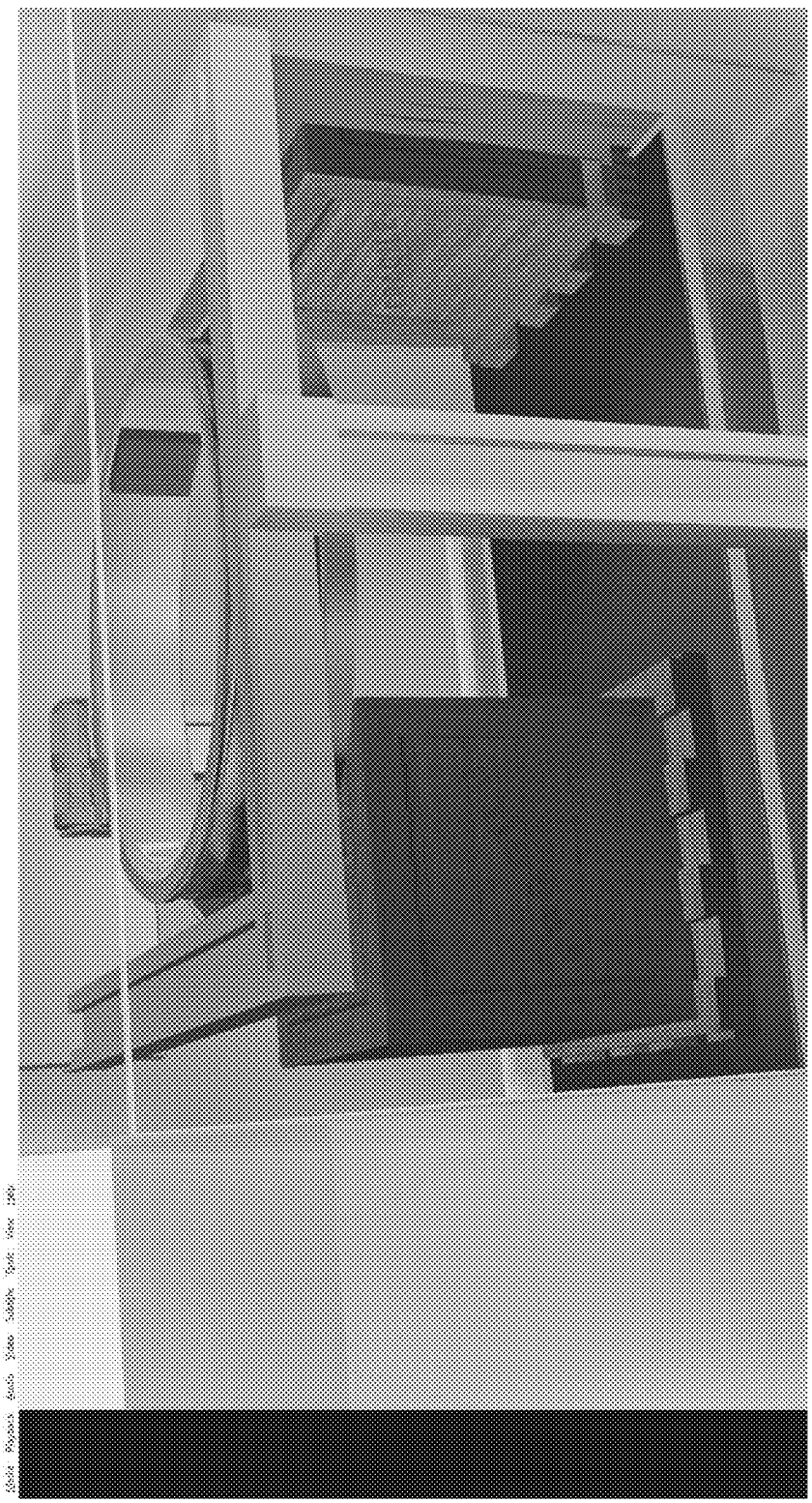
Figure 17:
Figure 18:

Shown in FIGS. 7-17 is a hypothetical execution of scanning operations conducted on multiple pallets. In FIG. 7 a pallet is deposited on the conveyor, and moved into a scanning area in FIG. 8. The scanning platform begins to rotate and scan the object in FIG. 9, and in this example execution scanning from top to bottom. FIGS. 10-13 shown the scanning platform moving towards the bottom of the pallet, and once the scan is complete returning to an upper position at FIG. 14. FIGS. 15 and 16 illustrate the scanned object leaving the scanning area with a new pallet coming into the scanning area for scanning. FIG. 17 shows the scanned pallet exiting the scanning system for pickup by a forklift in FIG. 18.

Figure 19:
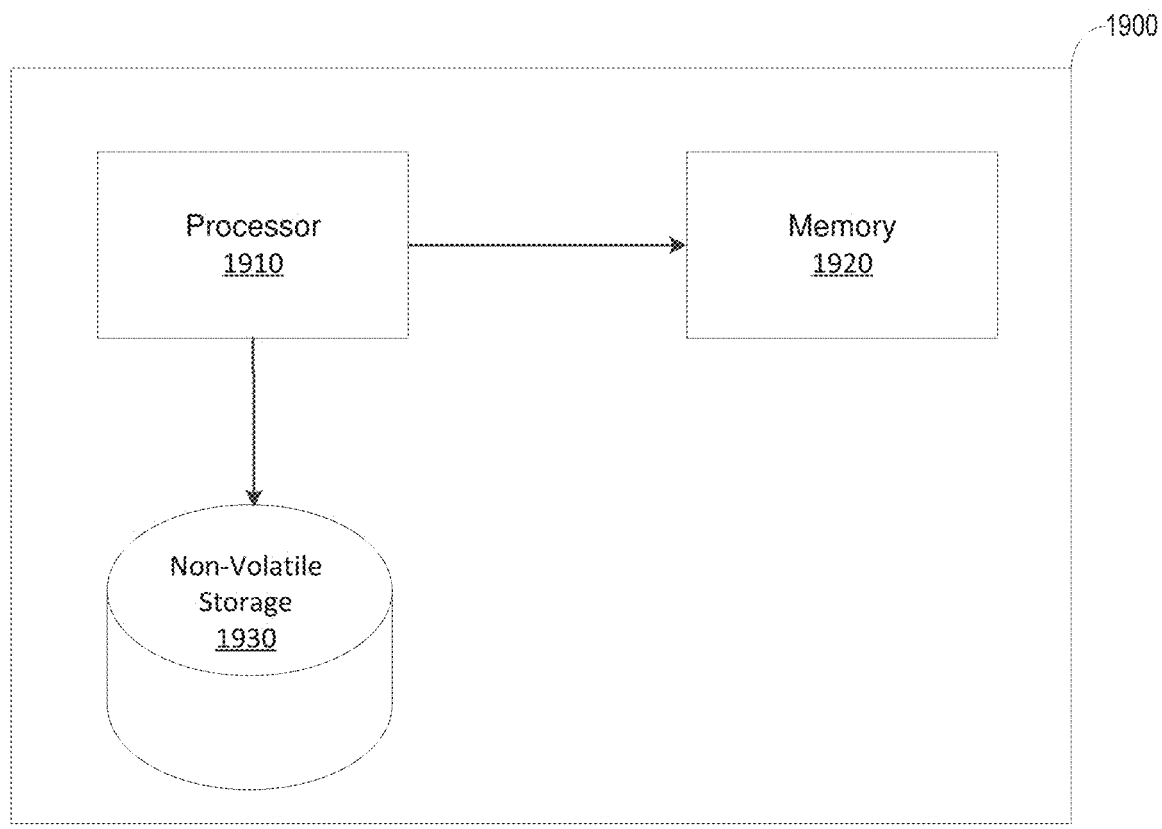
FIG. 19 is a block diagram of a computer system on which various functions can be implemented.
Figure 20A:
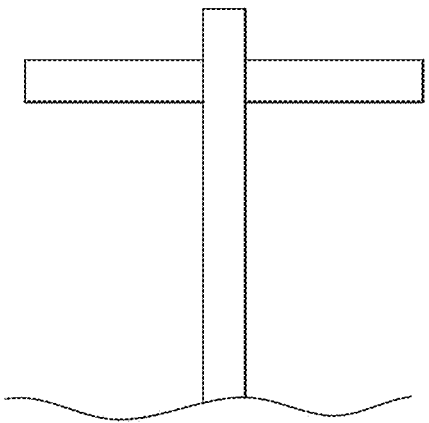
FIGS. 20A-D illustrate a side view of example support members for supporting a scanning platform.
Figure 20B:
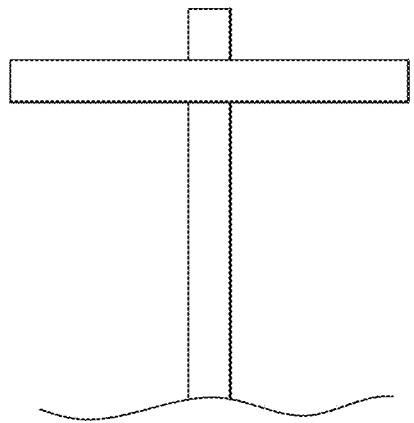
Figure 20C:
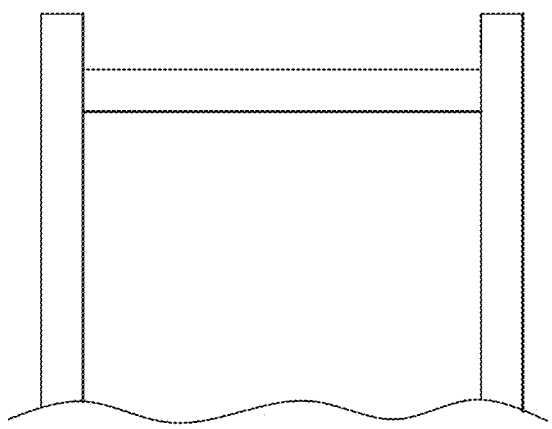
Figure 20D:
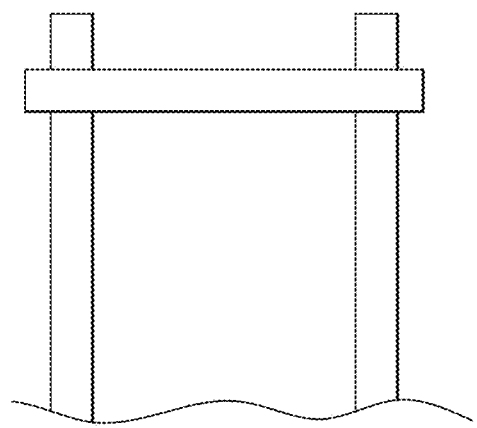
Figure 21A:
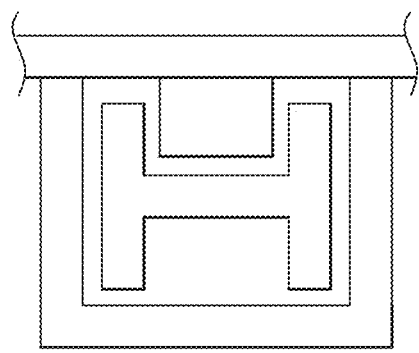
FIGS. 21A-C illustrate a top down view of examples of engagement between a lifting assembly and support members.
Figure 21B:
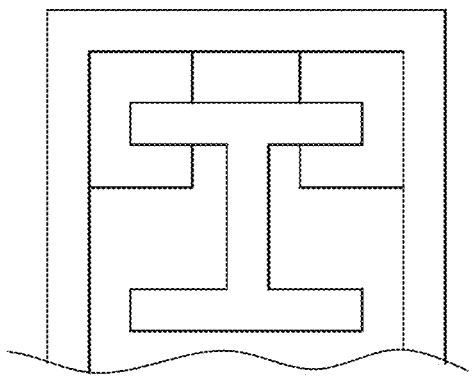
Figure 21C:
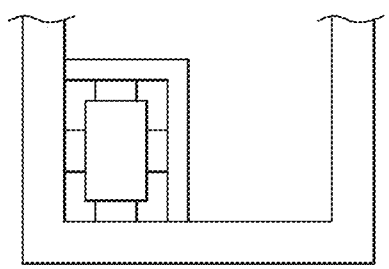

Modifications and variations of the discussed embodiments will be apparent to those of ordinary skill in the art and all such modifications and variations are included within the scope of the appended claims. An illustrative implementation of a computer system 1900 that may be used in connection with any of the embodiments of the disclosure provided herein is shown in FIG. 19. The computer system 1900 may include one or more processors 1910 and one or more articles of manufacture that comprise non-transitory computer-readable storage media (e.g., memory 1920 and one or more non-volatile storage media 1930). The processor 1910 may control writing data to and reading data from the memory 1920 and the non-volatile storage device 1930 in any suitable manner. To perform any of the functionality described herein (e.g., image reconstruction, anomaly detection, etc.), the processor 1910 may execute one or more processor-executable instructions stored in one or more non-transitory computer-readable storage media (e.g., the memory 1920), which may serve as non-transitory computer-readable storage media storing processor-executable instructions for execution by the processor 1910.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein. Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIG. 3) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A scanning apparatus, the apparatus comprising:
a scanning platform including a rotating member coupled to a first emitter assembly and at least first detector assembly;
a lifting assembly for raising and lowering the scanning platform responsive to control signals; and
at least one processor when executing configured to:
trigger the rotating member and the first emitter assembly;
receive imaging data from at least the first detector assembly;
generate control signals for moving the scan platform across a height of an object to be scanned in a z-axis;
capture x-ray attenuation data for the object in three dimensions; and
a conveyor assembly for receiving an object to be scanned.

2. The scanning apparatus of claim 1, wherein the scanning platform is constructed and arranged on a horizontal plane relative to an installed surface.

3. The scanning apparatus of claim 1, wherein the scanning platform includes an open circumference around which the first emitter assembly and at least first detector assembly rotate.

4. The scanning apparatus of claim 3, wherein the scanning platform is constructed and arranged with the open circumference sized to accept large pallets having dimensions of at least 48 inch length, by 48-inch width, by 65 inch height.

5. The scanning apparatus of claim 1, further comprising at least a first support arm.

6. The scanning apparatus of claim 5, wherein at least a portion of the first support arm is disposed perpendicular to an installed surface for the scanning apparatus.

7. The scanning apparatus of claim 5, wherein the lifting assembly includes at least a first motor and a moveable engagement portion between the lifting assembly and the first support arm.

8. The scanning apparatus of claim 7, wherein responsive to control signals from the at least one processor the motor triggers raising or lowering of the moveable engagement portion along the first support member.

9. The scanning apparatus of claim 1, wherein the conveyor assembly includes machinery for lifting, moving, or positioning the object to be scanned.

10. The scanning apparatus of claim 1, wherein the conveyor assembly is responsive to control signals from the at least one processor to move the object into a scan position under the scanning platform.

11. The scanning apparatus of claim 1, wherein the at least one processor activates the conveyor assembly to move the object out of the scanning apparatus.

12. The scanning apparatus of claim 1, wherein the at least one processor activates the lifting assembly to position the scanning platform above a path of a second object to be scanned during movement into the scanning area.

13. The scanning apparatus of claim 1, further comprising positioning sensors that identify when the object is under an open circumference defined by the scanning platform.

14. The scanning apparatus of claim 1, wherein the at least one processor is configured to operate the conveyor assembly to position the object under an open circumference defined by the scanning platform.

15. The scanning apparatus of claim 1, further comprising an entry housing constructed to support a conveyor and receive a pallet for scanning.

16. The scanning apparatus of claim 1, further comprising an exit housing constructed to support a conveyor and position a pallet for retrieval.

17. The scanning apparatus of claim 1, wherein the at least one processor is configured to reconstruct an image of the object to be scanned from the x-ray attenuation data.

18. A scanning system for generating computer tomography ("CT") images, the system comprising:
- at least one processor operatively connected to a memory, the at least one processor when executing configured to:
  - activate a rotating member and a first emitter assembly including an x-ray source connected to the rotating member;
  - receive imaging data from at least a first detector assembly;
  - generate control signals for moving a horizontally disposed scan platform including the rotating member along a height of an object to be scanned in a z-axis;
  - capture x-ray attenuation data for the object in three dimensions; and
  - receive an object to be scanned from a conveyor assembly.

19. The system of claim 18, wherein the at least one processor is configured to move the object to be scanned using a conveyor to position the object in a scanning area under the scanning platform.

20. A method for capturing computer tomography ("CT") images of an object, the method comprising:
- activating, by at least one processor, a rotating member, coupled to a first emitter assembly, including an x-ray source and at least first detector assembly;
- moving a scanning platform including the rotating member, the first emitter assembly, and the first detector assembly responsive to control signals from the at least one processor, wherein moving includes generating, by the at least one processor control signals for moving the scan platform across a height of an object to be scanned in a z-axis;
- receiving, by the at least one processor, x-ray attenuation data from at least the first detector assembly; and
- receiving an object to be scanned from a conveyor assembly.

21. The method of claim 20, further comprising reconstructing a digital image of the object to be scanned from the x-ray attenuation data for the object.

22. A non-transitory computer-readable medium comprising instruction, the instruction when executed cause a computer system to perform a method for capturing computer tomography ("CT") images of an object, the method comprising:
- activating a rotating member, coupled to a first emitter assembly, including an x-ray source and at least first detector assembly;
- moving a scanning platform including the rotating member, the first emitter assembly, and the first detector assembly responsive to control signals, wherein moving includes generating the control signals for moving the scan platform across a height of an object to be scanned in a z-axis; and
- receiving x-ray attenuation data from at least the first detector assembly; and
- receiving an object to be scanned from a conveyor assembly.

* * * * *